United States Patent (12)

Inoue

(10) Patent No.: US 11,294,829 B2
(45) Date of Patent: Apr. 5, 2022

US011294829B2

(54) CACHE REPLACEMENT WITH NO ADDITIONAL MEMORY SPACE

(71) Applicant: INTERNATIONAL BUSINESS MACHINES CORPORATION, Armonk, NY (US)

(72) Inventor: Hiroshi Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/854,728

(22) Filed: Apr. 21, 2020

(65) Prior Publication Data

US 2021/0326272 A1    Oct. 21, 2021

(51) Int. Cl.
    *G06F 12/123*    (2016.01)
(52) U.S. Cl.
    CPC .... *G06F 12/124* (2013.01); *G06F 2212/1021* (2013.01)
(58) Field of Classification Search
    None
    See application file for complete search history.

(56) References Cited

U.S. PATENT DOCUMENTS

| | | | |
|---|---|---|---|
| 6,449,695 B1 * | 9/2002 | Bereznyi | G06F 16/9574 711/134 |
| 6,453,404 B1 * | 9/2002 | Bereznyi | G06F 12/023 711/119 |
| 6,701,393 B1 * | 3/2004 | Kemeny | G06F 12/122 710/40 |
| 8,117,396 B1 * | 2/2012 | Fair | H04L 67/1097 711/133 |
| 10,942,866 B1 * | 3/2021 | Holmes | G06F 16/24552 |
| 2003/0149843 A1 * | 8/2003 | Jarvis | G06F 12/123 711/133 |

(Continued)

FOREIGN PATENT DOCUMENTS

CN        107729263 B    2/2007

OTHER PUBLICATIONS

Abel et al., "Measurement-based Modeling of the Cache Replacement Policy", 2013 IEEE 19th Real-Time and Embedded Technology and Applications Symposium (RTAS), Apr. 2013, 10 pages.

(Continued)

*Primary Examiner* — William E. Baughman
(74) *Attorney, Agent, or Firm* — Tutunjian & Bitetto, P.C.; Randall Bluestone

(57) ABSTRACT

A method configures a cache to implement a LRU management technique. The cache has N entries divided into B buckets. Each bucket has a number of entries equal to P entries*M vectors, wherein N=B*P*M. Any P entry within any M vector is ordered using an in-vector LRU ordering process. Any entry within any bucket is ordered in LRU within the vectors and buckets. The LRU management technique moves a found entry to a first position within a same M vector, responsive to a lookup for a specified key, and permutes the found entry and a last entry in a previous M vector, responsive to the found entry already being in the first position within a vector and the same one of the M vectors not being a first vector in the bucket in the moving step.

20 Claims, 6 Drawing Sheets

(56) References Cited

U.S. PATENT DOCUMENTS

| | | | |
|---|---|---|---|
| 2009/0204753 A1* | 8/2009 | Bridge, Jr. | G06F 12/123 |
| | | | 711/106 |
| 2012/0047329 A1* | 2/2012 | Goel | G06F 12/0882 |
| | | | 711/125 |
| 2012/0060015 A1* | 3/2012 | Eichenberger | G06F 9/30036 |
| | | | 712/4 |
| 2014/0223106 A1* | 8/2014 | Shivashankaraiah | |
| | | | G06F 12/123 |
| | | | 711/136 |
| 2014/0237193 A1* | 8/2014 | Shivashankaraiah | |
| | | | G06F 12/123 |
| | | | 711/136 |
| 2018/0373645 A1* | 12/2018 | Anderson | G06F 12/128 |
| 2019/0042471 A1 | 2/2019 | Wang et al. | |
| 2021/0216475 A1* | 7/2021 | Kucherov | G06F 12/123 |

OTHER PUBLICATIONS

Jiménez, "Insertion and Promotion for Tree-Based PseudoLRU Last-Level Caches", MICRO-46, Dec. 2013, pp. 285-296.

Beckmann et al., "LHD: Improving Cache Hit Rate by Maximizing Hit Density", 15th USENIX Symposium on Networked Systems Design and Implementation (NSDI '18), Apr. 2018, 16 pages.

* cited by examiner

CACHE REPLACEMENT WITH NO ADDITIONAL MEMORY SPACE

BACKGROUND

The present invention generally relates to memory devices, and more particularly to efficient cache replacement with no additional memory space.

LRU (Least Recently Used) is a widely-used cache replacement algorithm. LRU selects the entry whose last use is the oldest for discarding. Although the idea of LRU is simple, it incurs high runtime overhead due to the following: each entry in the cache needs a record for its last access time stamp or the order of accesses (e.g., as a linked list); and additional bookkeeping operations are required to maintain the record when looking up or adding an entry in the cache.

SUMMARY

According to aspects of the present invention, a computer-implemented method is provided for managing a cache having a vector register with a permutation function. The method includes configuring the cache to implement a Least Recently Used (LRU) management technique. The cache further has N entries divided into B buckets. Each of the B buckets has a number of entries equal to P entries*M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets. The LRU management technique further includes moving a found entry, from among the P entries, to a first position within a same one of the M vectors, responsive to a lookup for a specified key. The LRU management technique also includes permuting the found entry and a last entry from among the P entries in a previous one of the M vectors, responsive to the found entry already being in the first position within a vector and the same one of the M vectors not being a first vector in the bucket in the moving step.

According to other aspects of the present invention, a computer program product for managing a cache having a vector register with a permutation function, the computer program product comprising a non-transitory computer readable storage medium having program instructions embodied therewith, the program instructions executable by a computer to cause the computer to perform a method. The method includes configuring the cache to implement a Least Recently Used (LRU) management technique. The cache further has N entries divided into B buckets. Each of the B buckets has a number of entries equal to P entries*M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets. The LRU management technique further includes moving a found entry, from among the P entries, to a first position within a same one of the M vectors, responsive to a lookup for a specified key. The LRU management technique also includes permuting the found entry and a last entry from among the P entries in a previous one of the M vectors, responsive to the found entry already being in the first position within a vector and the same one of the M vectors not being a first vector in the bucket in said moving step.

According to yet other aspects of the present invention, a computer processing system is provided for determining command-to-process correspondence. The computer processing system includes a memory device including program code stored thereon. The computer processing system further includes a hardware processor, operatively coupled to the memory device, and configured to run the program code stored on the memory device to configure the cache to implement a Least Recently Used (LRU) management technique. The cache further has N entries divided into B buckets. Each of the B buckets having a number of entries equal to P entries*M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets. The cache is configured to implement the LRU management technique to move a found entry, from among the P entries, to a first position within a same one of the M vectors, responsive to a lookup for a specified key, and permute the found entry and a last entry from among the P entries in a previous one of the M vectors, responsive to the found entry already being in the first position within a vector and the same one of the M vectors not being a first vector in the bucket in said moving step.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
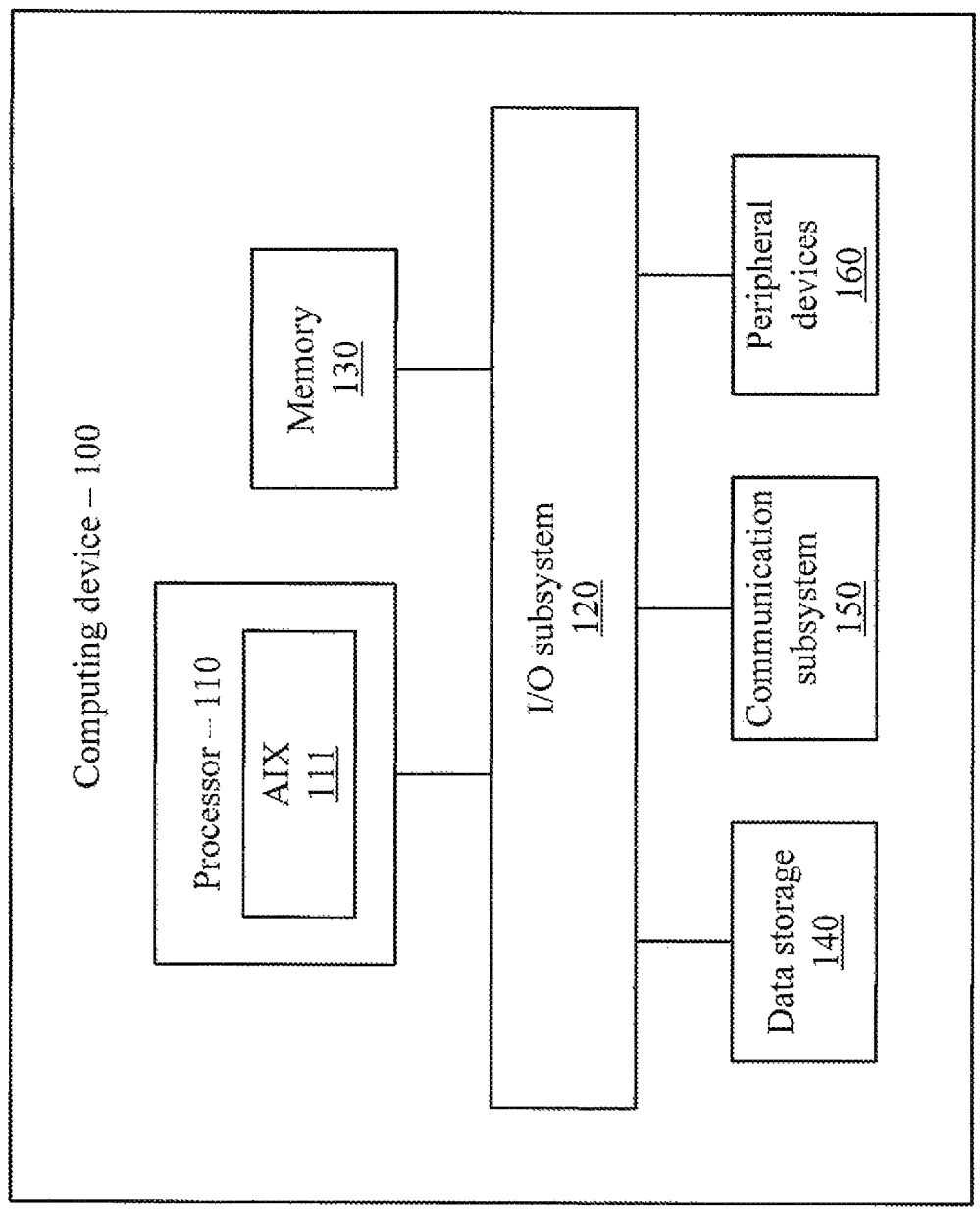
FIG. 1 is a block diagram showing an exemplary computing device, in accordance with an embodiment of the present invention.

Embodiments of the present invention are directed to efficient cache replacement with no additional memory space (e.g., without any LRU metadata).

Embodiments of the present invention provide a set-associative cache which enables both a high cache hit ratio and high runtime efficiency using in-vector LRU as a building block.

In-vector LRU is an efficient Single Instruction Multiple Data (SIMD)-based LRU implementation which does not use additional memory per element for LRU among a small number of entries (P), which can fit within a vector register. For example, P=4 for 64-bit keys with a 256-bit vector register. Elements in a vector are reordered in the order of recent accesses using permutation instructions.

In further detail, in-vector LRU for least recently used (LRU) cache replacement includes a computing device with a processor with vector instruction support. The computing device retrieves a bucket of an associative cache from memory that includes multiple entries arranged from front to back. The bucket may be a 256-bit array including eight 32-bit entries. The bucket may be a 512-bit array including 16 32-bit or 8 64-bit entries. For lookups, a matching entry is located at a position in the bucket. The computing device executes a vector permutation processor instruction that moves the matching entry to the front of the bucket while preserving the order of other entries of the bucket. For insertion, an inserted entry is written at the back of the bucket. The computing device executes a vector permutation processor instruction that moves the inserted entry to the front of the bucket while preserving the order of other entries. The permuted bucket is stored to the memory.

Herein, in accordance with one or more embodiments of the present invention, an efficient cache replacement strategy is provided for N entries using in-vector LRU for P entries as a building block, where N>>P.

That is, one or embodiments of the present invention provide a new cache replacement algorithm and its implementation. The present invention achieves high throughput by efficiently utilizing SIMD instructions of today's processors without using additional memory (LRU metadata) for each cached item to record the information like the last access timestamp. Moreover, multi-step LRU outperforms a widely-used LRU replacement algorithm in terms of the cache hit ratio by implicitly taking access frequency of items as well as access recency into account. To avoid using per-item LRU metadata for determining the item to evict, the present invention keeps rearranging items in the order of access recency within a small set that can fit within a vector register using vector shuffle instructions (called in-vector LRU management technique). Since the in-vector LRU can manage only several items that can fit in one vector register, we construct a set associative cache by using the in-vector LRU as a building block. Since naive P-way set-associative cache based on an in-vector LRU for P items has a poorer cache hit ratio than the LRU cache, we use multiple vectors within a set and decide the item to evict by our new multi-step LRU algorithm. The present invention does not use per-item LRU metadata at all.

Embodiments of the present invention can be embodied herein by respective operations operation 1 (op1), operation 2 (op2), and operation 3 (op3) described herein. Op1 relates to a get instruction and op 2 and op3 relate to a get instruction. These different operations are described in detail hereinbelow and are all performed in a LRU managed environment.

The present invention provides a pseudo-LRU algorithm to manage replacement within each set consisting of more than P items. Here, we assume each set consists of M*P items (or M vectors). The first vector contains MRU items, and the M-th vector contains LRU items. Within a vector, items are also ordered from the MRU to LRU ones. Hence the last item of the M-th vector is the LRU item in the set and to be evicted next. With multi-step LRU, a newly added item is placed at the first (MRU) position of the M-th vector, instead of the MRU position of the first vector. Since the present invention adds the new item in the last vector and evicts the LRU item from the same vector (op1), the present invention needs to update only this M-th vector whereas the exact LRU requires updating all M vectors. For a get request, we scan all vectors to find the requested item. If an item is found in the i-th vector, for example, we move this item to the MRU position of the i-th vector instead of the MRU position of the first vector to avoid updating multiple vectors (op2). Here, if the found item is already at the MRU position on the i-th vector, we swap this item with the LRU item of (i−1)-th vector (op3). Hence, a newly added item needs to be frequently accessed to be placed in the first vector, whereas any item can go directly to the MRU position with only one access in the exact LRU. This multi-step LRU approach of the present invention is efficient because the present invention only needs to modify one vector or swap items between two vectors for both put and get operations. Moreover, with this multi-step LRU approach, only frequently accessed items are placed in vectors other than the last one; items in the non-last vectors are not evicted from a cache by an item that is accessed only once. This characteristic makes it possible to protect frequently-accessed items from being evicted by items, each of which is accessed only once.

FIG. 1 is a block diagram showing an exemplary computing device 100, in accordance with an embodiment of the present invention. The computing device 100 is configured to perform least recently used cache replacement and includes a processor 110 with vector instruction support 111, illustratively embodied as in the IBM® AIX (although other vector support can be used). The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. As described above, the processor 110 includes vector instruction support 111, which may be embodied as execution resources, instruction set support, and other hardware, firmware, and/or microcode resources for single-instruction multiple data (SIMD) operations. In particular, the vector instruction support 111 may include one or more processor instructions to perform permutation of multiple data items (also interchangeably referred to as "data entries" or "entries" in short) within a vector register or other data location. The vector instruction support 111 is illustratively embodied as IBM® AIX. In other embodiments, the vector instruction support 111 may be embodied as the NEON implementation of the Advanced SIMD extension for various ARM processor architectures provided by Arm Limited.

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
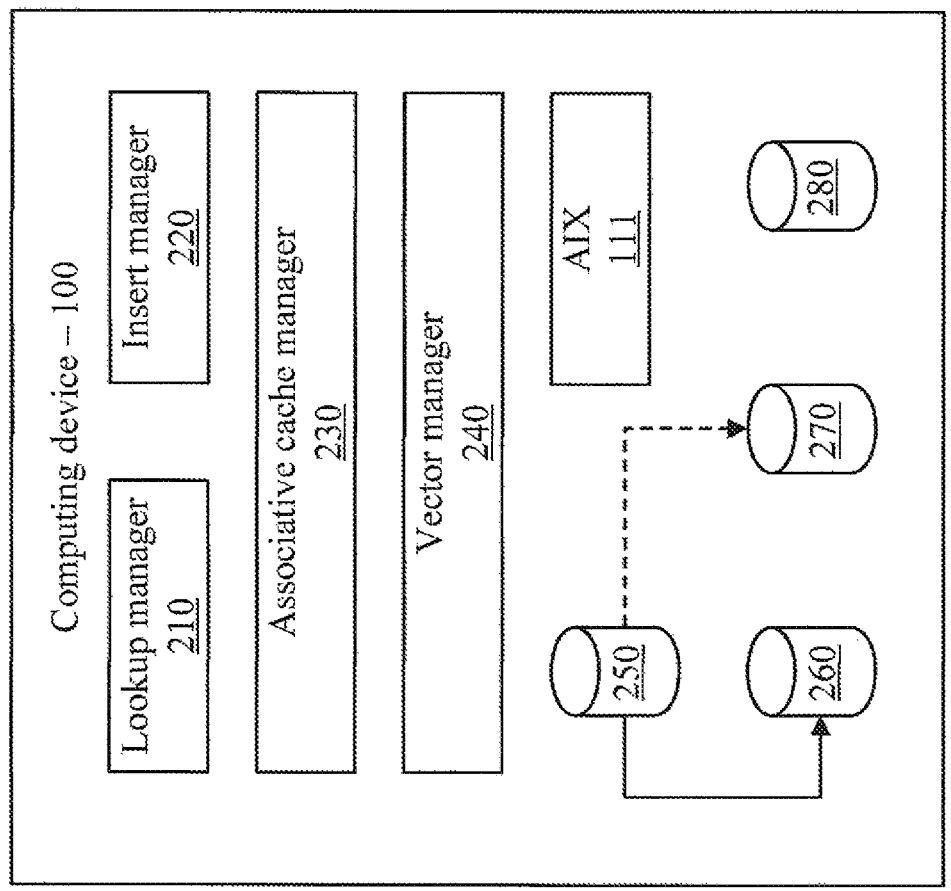
FIG. 2 is a block diagram showing an exemplary environment of computing device 100 during operation, in accordance with an embodiment of the present invention.

These and other variations of a hardware processor subsystem are also contemplated in accordance with embodiments of the present invention FIG. 2 is a block diagram showing an exemplary environment 200 of computing device 100 during operation, in accordance with an embodiment of the present invention.

The environment 200 includes a lookup manager 210, an insert manager 220, an associative cache manager 230, and a vector manager 240. The various components of the environment 200 may be thereof. As such, in some embodiments, one or more of the components of the environment 200 may be embodied as circuitry or collection of electrical devices (e.g., lookup manager circuitry 210, insert manager circuitry 220, associative cache manager circuitry 230, and/or vector manager circuitry 240). It should be appreciated that, in such embodiments, one or more of the lookup manager circuitry 210, the insert manager circuitry 220, the associative cache manager circuitry 230, and/or the vector manager circuitry 240 may form a portion of one or more of the processor 110 and/or other components of the computing device 100. Additionally, in some embodiments, one or more of the illustrative components may form a portion of another component and/or one or more of the illustrative components may be independent of one another.

The associative cache manager 230 is configured to generate a hash value as a function of a data item and retrieve an associative cache bucket 250 of an associative cache from the memory 130 as a function of the hash value. Each bucket 250 includes multiple entries arranged in an order from front to back. Each entry is sized to store a data item. In some embodiments, the bucket 250 may be embodied as a 256-bit array of eight entries, which each entry embodied as a 32-bit value. In some embodiments, retrieving the bucket 250 as a function of the hash value includes indexing a hash table in the memory 130 with the hash value.

The associative cache manager 230 is further configured to store the bucket 250 in the memory 130 in response to moving an entry of the bucket 250 to the front of the bucket 250. Additionally or alternatively, although illustrated as including a single associative cache, it should be understood that the techniques disclosed herein may be used in any level or levels of a multi-level cache hierarchy.

The lookup manager 210 is configured to identify a matching entry that includes a data item at a particular position within the bucket 250. The lookup manager 210 may be further configured to return a data value 260 associated with the matching item in response to identifying the matching entry of the bucket 250. In some embodiments, the data item may include a key for an external data item 260. In some embodiments, the data item may include a signature of an external key 270 of an external data item 260 and a signature mapping index, and returning the data item may include retrieving the external key 270 from the memory 130 using the signature mapping index.

The insert manager 220 is configured to store an inserted item at an entry of the bucket 250 located at the back of the bucket 250. In some embodiments, the entries of the bucket 250 may be partitioned into multiple regions, and the inserted item may be stored at an entry located at the back of a particular region of the bucket 250 associated with the inserted item. The insert manager 220 may be further configured to determine the region associated with the inserted item as a function of a priority level associated with the inserted item. As described above, in some embodiments, the inserted item may include a key for an external data item 260. In some embodiments, the inserted item may include a signature of an external key 270 and a signature mapping index.

The vector manager 240 is configured to execute a vector permutation processor instruction in response to identifying the matching entry and/or storing the inserted item. The vector permutation processor instruction may include an AIX instruction. The vector manager 240 is further configured to move, by the processor 110 (e.g., using the vector instruction support 111), the matching entry and/or the inserted entry of the bucket 250 to the front of the bucket 250 in response executing the vector permutation processor instruction. Moving the matching entry and/or the inserted entry includes preserving the order of other entries of the bucket 250. The vector permutation processor instruction may be executed with the bucket 250 and a predetermined permutation pattern 280. The vector manager 240 may be further configured to select the predetermined permutation pattern 280 from a plurality of predetermined permutation patterns 280 as a function of the position of the matching item and/or the inserted item in the bucket 250.

Further to the invention, three operations can be performed to advantageously improve cache runtime efficiency and to obtain a higher cache hit ratio.

The first operation, op1, involves evicting a least-recently-used entry, from among the P entries, which is a last element of an M-th vector and adding a new entry as a first entry of the M-th vector, responsive to adding the new entry into a given one of the B buckets. FIG. 6 below graphically shows an example of op1 relative to FIG. 5, in accordance with an embodiment of the present invention.

Figure 7:
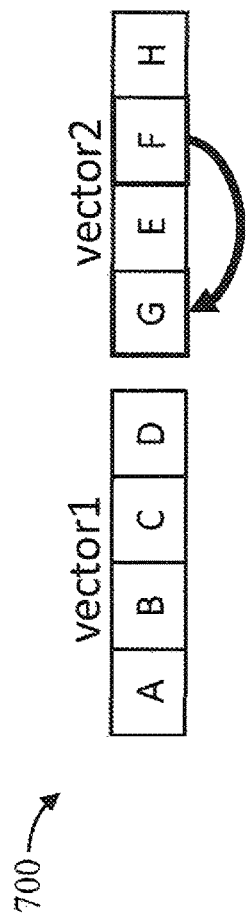
FIG. 7 is a block diagram showing an exemplary modification of the bucket of FIG. 5 in response to a lookup operation (looking up an entry in a cache), in accordance with an embodiment of the present invention.
Figure 9:
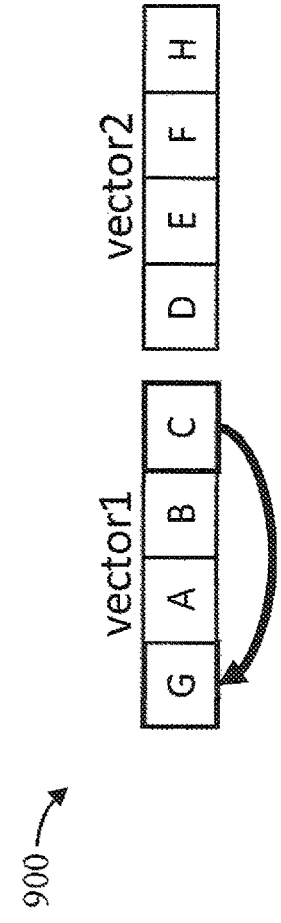
FIG. 9 is a block diagram showing a yet further exemplary modification of the bucket in FIG. 5 in response to a lookup operation (looking up an entry in a cache), in accordance with an embodiment of the present invention.

The second operation, op2, involves moving a found entry, from among the P entries, to a first position within a same one of the M vectors, responsive to a lookup for a specified key. FIGS. 7 and 9 below graphically show an example of op2 relative to FIG. 5, in accordance with an embodiment of the present invention.

Figure 8:
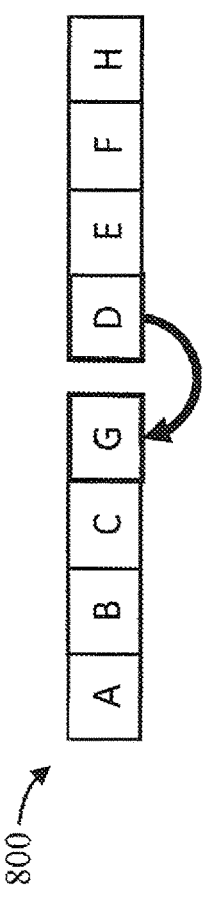
FIG. 8 is a block diagram showing a further exemplary modification of the bucket in FIG. 5 in response to a lookup operation (looking up an entry in a cache), in accordance with an embodiment of the present invention.

The third operation, op3, involves permuting the found entry and a last entry from among the P entries in a previous one of the M vectors, responsive to the found entry already being in the first position within a vector and the same one of the M vectors not being a first vector in the bucket in said moving step. FIG. 8 below graphically shows an example of op3 relative to FIG. 5, in accordance with an embodiment of the present invention.

Thus, referring back to FIGS. 2 and 3, the insert manager 220 is configured to perform op1 by evicting a least-recently-used entry, from among the P entries, which is a last element of an M-th vector and adding a new entry as a first entry of the M-th vector, responsive to adding the new entry into a given one of the B buckets.

The lookup manager 210 is configured to perform op2 by moving a found entry, from among the P entries, to a first position within a same one of the M vectors, responsive to a lookup for a specified key.

The lookup manager 210 is also configured to perform op3 by permuting the found entry and a last entry from among the P entries in a previous one of the M vectors, responsive to the found entry already being in the first position within a vector and the same one of the M vectors not being a first vector in the bucket in the moving step of op2.

Operations op1, op2, and op3 advantageously enable efficient cache replacement without additional memory space.

Figure 3:
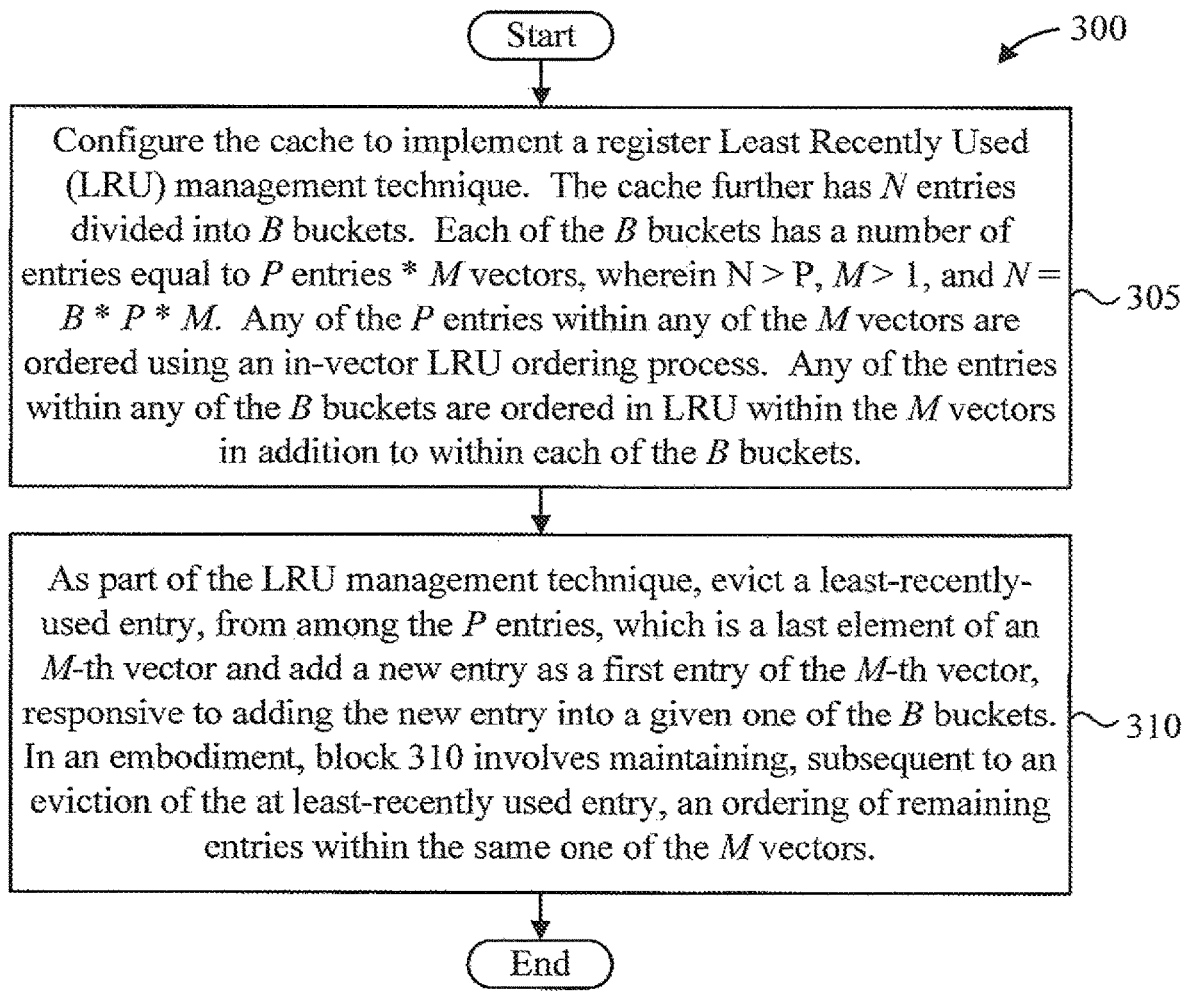
FIG. 3 is a flow diagram showing an exemplary method for managing a cache having a vector register with a permutation function, in accordance with an embodiment of the present invention.

FIG. 3 is a flow diagram showing an exemplary method 300 for managing a cache having a vector register with a permutation function, in accordance with an embodiment of the present invention. In particular, method 300 relates to an addition operation (adding an entry to a cache bucket). In particular, method 300 relates to op1 described herein. Method 300 provides efficient cache replacement with no additional memory space.

At block 305, configure the cache to implement a Least Recently Used (LRU) management technique. The cache further has N entries divided into B buckets. Each of the B buckets has a number of entries equal to P entries*M vectors, wherein N>P, M>1, and N=B*P*M. Any of the P entries within any of the M vectors are ordered using an in-vector LRU ordering process. Any of the entries within any of the B buckets are ordered in LRU within the M vectors in addition to within each of the B buckets.

At block 310, as part of the LRU management technique, evict a least-recently-used entry, from among the P entries, which is a last element of an M-th vector and add a new entry as a first entry of the M-th vector, responsive to adding the new entry into a given one of the B buckets.

In an embodiment, block 310 involves maintaining, subsequent to an eviction of the at least-recently used entry, an ordering of remaining entries within the same one of the M vectors. This is illustrated in FIG. 6.

Figure 4:
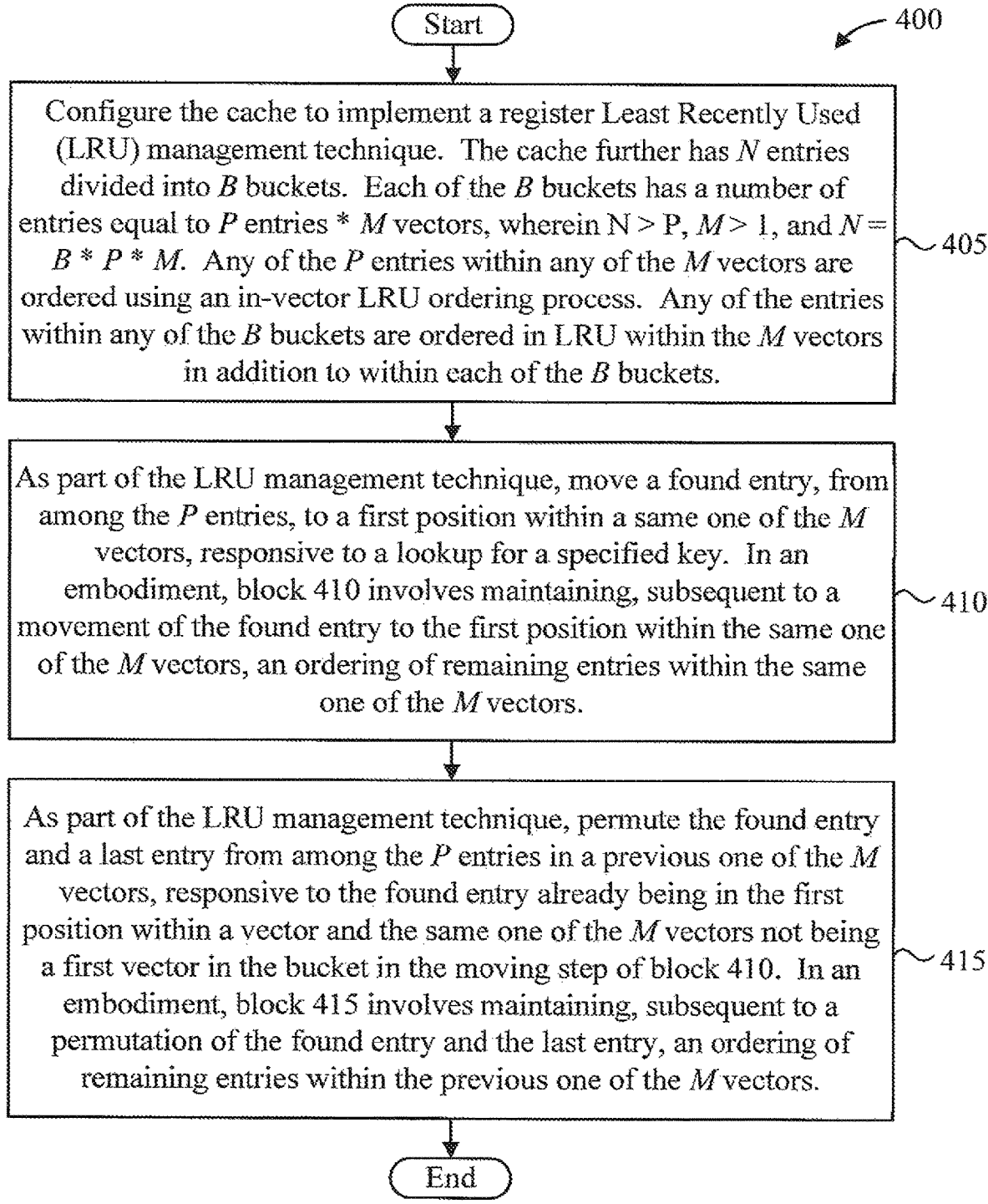
FIG. 4 is a flow diagram showing another exemplary method for managing a cache having a vector register with a permutation function, in accordance with an embodiment of the present invention.

FIG. 4 is a flow diagram showing another exemplary method 400 for managing a cache having a vector register with a permutation function, in accordance with an embodiment of the present invention. In particular, method 400 relates to a lookup operation (looking up an entry in a cache). In particular, method 400 relates to op2 and op3 described herein. Method 400 provides efficient cache replacement with no additional memory space.

At block 405, as part of the LRU management technique, configure the cache to implement a Least Recently Used (LRU) management technique. The cache further has N entries divided into B buckets. Each of the B buckets has a number of entries equal to P entries*M vectors, wherein N>P, M>1, and N=B*P*M. Any of the P entries within any of the M vectors are ordered using an in-vector LRU ordering process. Any of the entries within any of the B buckets are ordered in LRU within the M vectors in addition to within each of the B buckets.

At block 410, as part of the LRU management technique, move a found entry, from among the P entries, to a first position within a same one of the M vectors, responsive to a lookup for a specified key.

In an embodiment, block 410 involves maintaining, subsequent to a movement of the found entry to the first position within the same one of the M vectors, an ordering of remaining entries within the same one of the M vectors.

At block 415, as part of the LRU management technique, permute the found entry and a last entry from among the P entries in a previous one of the M vectors, responsive to the found entry already being in the first position within a vector and the same one of the M vectors not being a first vector in the bucket in the moving step of block 410.

In an embodiment, block 415 involves maintaining, subsequent to a permutation of the found entry and the last entry, an ordering of remaining entries within the previous one of the M vectors.

Thus, as noted above, the present invention can be considered to include three operations.

The first operation, op1, involves evicting a least-recently-used entry, from among the P entries, which is a last element of an M-th vector and adding a new entry as a first entry of the M-th vector, responsive to adding the new entry into a given one of the B buckets.

The second operation, op2, involves moving a found entry, from among the P entries, to a first position within a same one of the M vectors, responsive to a lookup for a specified key.

The third operation, op3, involves permuting the found entry and a last entry from among the P entries in a previous one of the M vectors, responsive to the found entry already being in the first position within a vector and the same one of the M vectors not being a first vector in the bucket in said moving step.

Figure 5:
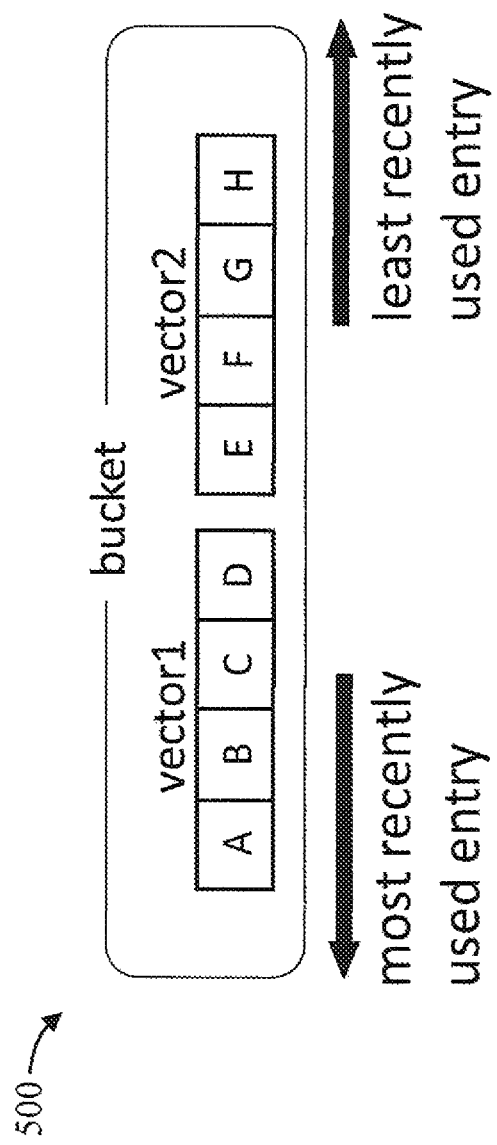
FIG. 5 is a block diagram showing an exemplary bucket, in accordance with an embodiment of the present invention.
Figure 6:
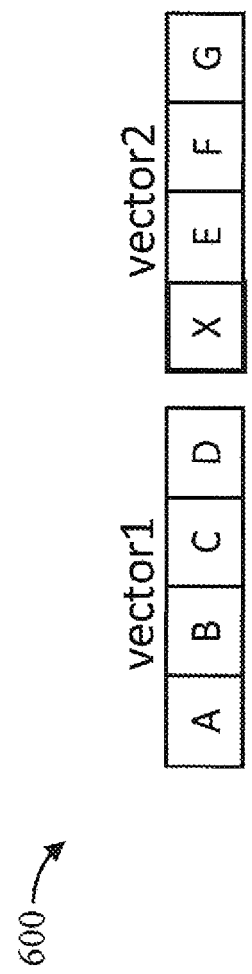
FIG. 6 is a block diagram showing an exemplary modification of the bucket of FIG. 5 in response to an addition operation (adding an entry to a cache bucket), in accordance with an embodiment of the present invention.

FIG. 5 is a block diagram showing an exemplary bucket 500, in accordance with an embodiment of the present invention. In the example, P=4 and M=2. The bucket 500 includes a first vector, "vector1", and a second vector, "vector2". Vector1 includes elements A, B, C, and D. Vector2 includes elements E, F, G and H.

Thus, bucket 500 is one of B buckets in a cache managed using a Least Recently Used (LRU) management technique. The cache further has N entries divided into B buckets. Each of the B buckets has a number of entries equal to P entries*M vectors. N>P, M>1, and N=B*P*M. Any of the P entries within any of the M vectors are ordered using an in-vector LRU ordering process. Any of the entries within any of the B buckets are ordered in LRU within the M vectors in addition to within each of the B buckets.

FIG. 6-9 relate to respective modifications to bucket 500 resulting from performing ops1-3 of the LRU management technique. In FIGS. 6-9, as well as FIG. 5, only keys are depicted for simplicity. Values associated with the keys are also moved along as the keys move.

FIG. 6 is a block diagram showing an exemplary modification 600 of the bucket 500 in FIG. 5 in response to an addition operation (adding an entry to a cache bucket), in accordance with an embodiment of the present invention. In particular, the addition operation is "put X", corresponding to op1. Accordingly, the least-recently-used entry H is evicted from vector2, and X is added as the first item of vector2 while preserving the ordering of the remaining entries E, F, and G. Vector1 is unmodified.

A put operation simply evicts the LRU item if the cache is full and inserts the new item. Since the last (P-th) item is always the LRU item, we do not need to do anything for finding the item to evict.

The put operation can be simply implemented as follows (assuming the cache is full and cache miss is already confirmed):
(1) Load P keys into a vector register.
(2) Move the LRU key into the MRU position using permutation.
(3) Replace the LRU key with the new key and then store back them into memory.
(4) Do steps 1 to 3 for values.

Before these steps (1)-(4), we check for an empty slot for all vectors. If there is an empty slot, we just put the new item there.

FIG. 7 is a block diagram showing an exemplary modification 700 of the bucket 500 in FIG. 5 in response to a lookup operation (looking up an entry in a cache), in accordance with an embodiment of the present invention. In particular, the lookup operation is "get G", corresponding to op2. Accordingly, the found item is moved to the first position with the same vector, vector2 while preserving the ordering of the remaining entries E, F, and H. Vector1 is unmodified.

A get operation consists of following steps:
(1) Load P keys from memory into a vector register.
(2) Check P keys against the query using SIMD compare.
(3) If no key hits, return here (a cache miss).
(4) When the i-th key hits, look up the in-memory constant table of permutation patterns using i as the index.
(5) Move i-th key into the MRU position by a permutation instruction with the pattern loaded in step 4 and store the rearranged keys in the vector register into the original memory location.
(6) Load P values into a vector register, rearrange them using the same pattern, and store the values back into memory.
(7) Return the result (a cache hit).

To use in step 4, we create a small constant table in memory to determine the permutation pattern efficiently.

In FIG. 7, the get query makes G included in vector1 since G is the MRU item in vector2 when it matches the query. This is called an upgrade.

In summary, to manage LRU replacement, a get operation of multistep LRU either (1) rearranges items within only one vector or (2) swaps two items between two neighboring vectors. Hence, multistep LRU is faster than the exact LRU, which may require updating multiple vectors per get operation. In FIG. 7, the get query makes G the MRU item of the entire set. In general, at least (2M−1) get requests to the same key are used to make a new item placed at the MRU position of the entire set.

FIG. 8 is a block diagram showing a further exemplary modification 800 of the bucket 500 in FIG. 5 in response to a lookup operation (looking up an entry in a cache), in accordance with an embodiment of the present invention. In particular, the lookup operation is "get G", corresponding to op3. Accordingly, since the found item, G, is already in the first position within a vector, vector2, and the vector (vector2) is not the first vector in the bucket, the found item, G, is swapped (permuted) with the last item, D, in the previous vector, vector1. In such a case, for buckets having more than 2 vectors, op3 will affect only two vectors, and i-th vector and an i-th−1 vector.

FIG. 9 is a block diagram showing a yet further exemplary modification 900 of the bucket 500 in FIG. 5 in response to a lookup operation (looking up an entry in a cache), in accordance with an embodiment of the present invention. In particular, the lookup operation is "get G", corresponding to op2. Accordingly, the found item is moved to the first position with the same vector, vector1 while preserving the ordering of the remaining entries A, B, and C. Vector2 is unmodified.

Since rearranging items by vector load, permute, and store instructions is much more efficient than rearranging items by scalar load and stores, the present invention does not incur significant overhead at each get and put operation. Especially, the put operation is much simpler than in other algorithms since the item to evict is always placed at the last position in the vector and we do not need to scan items or access the linked list to find the LRU item.

A description will now be given regarding some of the various attendant benefits of the present invention.

Embodiments of the present invention provide runtime efficiency. For example, when adding or looking up an item, embodiments of the present invention only modify one vector (reorders within the one vector) or swaps two items. In contrast, if exact LRU management is performed within M vectors, multiple vectors (often all vectors) need to be modified for each addition or lookup. Hence, embodiments of the present invention are much faster.

Embodiments of the present invention provide a better cache hit ratio. For example, embodiments of the present invention inherently prioritize frequently accessed items in addition to recently accessed items for keeping in the cache. In embodiments of the present invention, a newly added item is placed at a middle point within a bucket instead of the top position. Hence, only frequently accessed items (not only recently accessed) can be in top vectors; the frequently used items are protected from a flood of new items used only once. Considering access frequency in addition to access recency gives higher cache hit ratios.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for managing a cache having a vector register with a permutation function, comprising:

configuring the cache to implement a Least Recently Used (LRU) management technique, the cache further having N entries divided into B buckets, each of the B buckets having a number of entries equal to P entries *M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets, and wherein the LRU management technique further comprises:

moving a found entry, from among the P entries, to a first position within a same one of the M vectors, responsive to a lookup for a specified key; and permuting the found entry and a last entry from among the P entries in a previous one of the M vectors, responsive to the found entry already being in the first position within a vector and the same one of the M vectors not being a first vector in the bucket in said moving step.

2. The computer-implemented method of claim 1, wherein the LRU management technique further comprises evicting a least-recently-used entry, from among the P entries, which is a last element of an M-th vector and adding a new entry as a first entry of the M-th vector, responsive to adding the new entry into a given one of the B buckets.

3. The computer-implemented method of claim 2, wherein said evicting step is performed to maintain, subsequent to an eviction of the at least-recently used entry, an ordering of remaining entries within the same one of the M vectors.

4. The computer-implemented method of claim 1, wherein the in-vector LRU ordering process comprises moving a given one of the P entries to a front of a particular one of the B buckets.

5. The computer-implemented method of claim 1, wherein the in-vector LRU ordering process moves the given one of the P entries to the front of the particular one of the B buckets by maintaining an order of remaining entries in the particular one of the B buckets subsequent to a move.

6. The computer-implemented method of claim 1, wherein the in-vector LRU ordering process comprises ordering any of the P entries in any of the B buckets in an order of recent accesses using permutation instructions.

7. The computer-implemented method of claim 1, wherein said permuting step is performed using a vector permute instruction.

8. The computer-implemented method of claim 7, wherein the vector permute instruction is a AIX instruction.

9. The computer-implemented method of claim 1, wherein each of the B buckets comprises a 512-bit array including 16 32-bit entries.

10. The computer-implemented method of claim 1, wherein each of the B buckets comprises a 512 bit array including 8 64-bit entries.

11. The computer-implemented method of claim 1, repeating said moving step, responsive to a subsequent lookup for the specified key.

12. The computer-implemented method of claim 1, wherein said moving step is performed to maintain, subsequent to a movement of the found entry to the first position within the same one of the M vectors, an ordering of remaining entries within the same one of the M vectors.

13. The computer-implemented method of claim 1, wherein said permuting step is performed to maintain, subsequent to a permutation of the found entry and the last entry, an ordering of remaining entries within the same one of the M vectors.

14. A computer program product for managing a cache having a vector register with a permutation function, the computer program product comprising a non-transitory computer readable storage medium having program instructions embodied therewith, the program instructions executable by a computer to cause the computer to perform a method comprising:
   configuring the cache to implement a Least Recently Used (LRU) management technique, the cache further having N entries divided into B buckets, each of the B buckets having a number of entries equal to P entries *M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets, and wherein the LRU management technique further comprises:
   moving a found entry, from among the P entries, to a first position within a same one of the M vectors, responsive to a lookup for a specified key; and
   permuting the found entry and a last entry from among the P entries in a previous one of the M vectors, responsive to the found entry already being in the first position within a vector and the same one of the M vectors not being a first vector in the bucket in said moving step.

15. The computer-implemented method of claim 14, wherein the LRU management technique further comprises evicting a least-recently-used entry, from among the P entries, which is a last element of an M-th vector and adding a new entry as a first entry of the M-th vector, responsive to adding the new entry into a given one of the B buckets.

16. The computer-implemented method of claim 15, wherein said evicting step is performed to maintain, subsequent to an eviction of the at least-recently used entry, an ordering of remaining entries within the same one of the M vectors.

17. The computer-implemented method of claim 14, repeating said moving step, responsive to a subsequent lookup for the specified key.

18. The computer-implemented method of claim 14, wherein said moving step is performed to maintain, subsequent to a movement of the found entry to the first position within the same one of the M vectors, an ordering of remaining entries within the same one of the M vectors.

19. The computer-implemented method of claim 14, wherein said permuting step is performed to maintain, subsequent to a permutation of the found entry and the last entry, an ordering of remaining entries within the same one of the M vectors.

20. A computer processing system for determining command-to-process correspondence, comprising:
   a memory device including program code stored thereon;
   a hardware processor, operatively coupled to the memory device, and configured to run the program code stored on the memory device to
   configure the cache to implement a Least Recently Used (LRU) management technique, the cache further having N entries divided into B buckets, each of the B buckets having a number of entries equal to P entries *M vectors, wherein N>P, M>1, and N=B*P*M, wherein any of the P entries within any of the M vectors are ordered using an in-vector LRU ordering process, wherein any of the entries within any of the B buckets are ordered in LRU within the M vectors in addition to within each of the B buckets, and wherein the cache is configured to implement the register LRU management technique to
   move a found entry, from among the P entries, to a first position within a same one of the M vectors, responsive to a lookup for a specified key; and
   permute the found entry and a last entry from among the P entries in a previous one of the M vectors, responsive to the found entry already being in the first position within a vector and the same one of the M vectors not being a first vector in the bucket in said moving step.

* * * * *